United States Patent
Jung et al.

(10) Patent No.: US 10,811,709 B2
(45) Date of Patent: Oct. 20, 2020

(54) METHOD OF CONTROLLING PURGE OF FUEL CELL SYSTEM FOR VEHICLE

(71) Applicant: Hyundai Motor Company, Seoul (KR)

(72) Inventors: Se Kwon Jung, Seoul (KR); Bu Kil Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1059 days.

(21) Appl. No.: 15/277,135

(22) Filed: Sep. 27, 2016

(65) Prior Publication Data

US 2017/0179511 A1 Jun. 22, 2017

(30) Foreign Application Priority Data

Dec. 17, 2015 (KR) ........................ 10-2015-0181206

(51) Int. Cl.
*H01M 8/04664* (2016.01)
*H01M 8/04537* (2016.01)
(Continued)

(52) U.S. Cl.
CPC ... *H01M 8/04686* (2013.01); *H01M 8/04231* (2013.01); *H01M 8/04589* (2013.01);
(Continued)

(58) Field of Classification Search
CPC ......... H01M 8/04686; H01M 8/04589; H01M 8/04656; H01M 8/04992; H01M 8/04231; H01M 2250/20; Y02T 90/32
See application file for complete search history.

(56) References Cited

U.S. PATENT DOCUMENTS

| | | | | |
|---|---|---|---|---|
| 2003/0012989 A1* | 1/2003 | Ueda | ................. | H01M 8/04231 |
| | | | | 429/415 |
| 2008/0096059 A1* | 4/2008 | Kanie | ............... | H01M 8/04089 |
| | | | | 429/430 |
| 2010/0190075 A1* | 7/2010 | Frost | ................. | H01M 8/04231 |
| | | | | 429/433 |

FOREIGN PATENT DOCUMENTS

| | | | |
|---|---|---|---|
| JP | 2005-302648 A | 10/2005 | |
| JP | 2006-040718 A | 2/2006 | |
| | (Continued) | | |

OTHER PUBLICATIONS

Strahl et al., Experimental study of hydrogen purge effects on performance and efficiency of an open-cathode Proton Exchange Membrane fuel cell system, Oct. 6, 2013 (Elseivier) and Journal of Power Sources 248 (2014), pp. 474-482 (Year: 2013).*

*Primary Examiner* — Sujoy K Kundu
*Assistant Examiner* — L. Anderson
(74) *Attorney, Agent, or Firm* — Mintz Levin Cohn Ferris Glovsky and Popeo, P.C.; Peter F. Corless

(57) ABSTRACT

A method of controlling purge of a fuel cell system for a vehicle is provided. The method determines whether a purge function is normally performed in controlling purge of discharging nitrogen, hydrogen, and vapor within an anode of a fuel cell system. Particularly, the method confirms whether purge is performed by measuring a duty or a current applied to a hydrogen supply valve and measuring a change in the duty before and after an application of a purge valve operation command while adjusting a pressure inside the anode, which supplies hydrogen, to be uniform. Further, a hydrogen supply amount supplied into an anode is estimated and a change rate of a hydrogen supply amount supplied to the anode and a hydrogen amount consumed during a generation of the fuel cell system are estimated during a (Continued)

purge function, to determine whether purge is actually performed based on the estimated information.

16 Claims, 7 Drawing Sheets

(51) Int. Cl.
    *H01M 8/04223*     (2016.01)
    *H01M 8/04992*     (2016.01)

(52) U.S. Cl.
    CPC ... *H01M 8/04656* (2013.01); *H01M 8/04992* (2013.01); *H01M 2250/20* (2013.01); *Y02T 90/32* (2013.01)

(56) References Cited

FOREIGN PATENT DOCUMENTS

| | | |
|---|---|---|
| JP | 2011-141019 A | 7/2011 |
| JP | 2012-084284 A | 4/2012 |
| KR | 10-2006-0058737 A | 5/2006 |
| KR | 2012-0059900 A | 6/2012 |

\* cited by examiner

US 10,811,709 B2

METHOD OF CONTROLLING PURGE OF FUEL CELL SYSTEM FOR VEHICLE

CROSS-REFERENCE TO RELATED APPLICATION

This application claims under 35 U.S.C. § 119(a) the benefit of Korean Patent Application No. 10-2015-0181206 filed on Dec. 17, 2015, the entire contents of which are incorporated herein by reference.

BACKGROUND

(a) Technical Field

The present disclosure relates to a method of controlling purge of a fuel cell system for a vehicle, and more particularly, to a method of controlling purge, which is capable of performing a purge function of discharging gas inside a stack of a fuel cell system and detecting whether the purge is performed.

(b) Background Art

Currently, research has been conducted to enhance a product quality and price competitiveness of a fuel cell system as the commercialization of the fuel cell system increases. Accordingly, a decrease in cost and product quality management factors by decreasing the number of components by combining functions of similar components has been researched.

Theoretically, only hydrogen is present in an anode of the fuel cell system. However, in an actual operation, the hydrogen crosses over through a Membrane Electrode Assembly (MEA), so that a substantial amount of water and impurities, such as nitrogen, flowing from a cathode are present in the anode. The water and the nitrogen are factors causing instability in the operation of the fuel cell system, and when the amount of nitrogen within the anode increases, a hydrogen concentration decreases, and thus, reactivity between a catalyst and hydrogen decreases inside the anode. Accordingly, an output of the fuel cell system decreases, and operation performance becomes unstable. Further, when water drops flowing into the anode block a flow path formed in a separating plate inside the stack, hydrogen lacks in the corresponding flow path, and thus, a reaction decreases and a carbon carrier is lost, thereby causing a problem of deterioration in durability of the system.

Accordingly, many of the polymer electrolyte membrane fuel cells (PEMFC) maintain the amount of nitrogen inside the system at a predetermined level or less (e.g., maintain a hydrogen concentration at a predetermined level or greater) through a purge function that discharges gas inside the anode. Further, a method of separating water inside the anode by installing a water trap (e.g., a gas-liquid separator) and discharging the separated water through a drain valve has been developed.

A configuration for preventing a problem generated when the purge function and the drain function are not properly performed has been researched. In particular, many the fuel cell systems of the related art monitor whether the purge function and the drain function are properly performed using a sensor (e.g., position sensor) that confirms whether a purge valve is opened and a water level sensor. However, such a technique requires additional sensors for the monitoring process, thus causing an increase in component cost, the components may have defects, and an accurate detection is not performed.

The above information disclosed in this section is merely for enhancement of understanding of the background of the invention and therefore it may contain information that does not form the prior art that is already known in this country to a person of ordinary skill in the art.

SUMMARY

The present disclosure provides a method of determining whether a purge function is properly performed without an additional sensor when purge of discharging nitrogen, hydrogen, and vapor within an anode is performed using a purge valve or a drain valve of a fuel cell system.

The present invention further provides a method of controlling purge to be re-performed by opening a valve again in response to determining that a purge function is not properly performed. Additionally, the present invention provides a method of controlling a supply of hydrogen to be stopped to prevent safety accidents caused by a leakage of hydrogen when a purge valve is not closed after the opening of the purge valve, and to safely terminate a fuel cell system to improve safety of a fuel cell vehicle.

In one aspect, the present invention provides a method of controlling purge of a fuel cell system for a vehicle that may include: applying (e.g., transmitting) a purge valve opening signal, and detecting valve duties of a hydrogen supply valve before and after the application of the purge valve opening signal; calculating a difference value between the valve duty of the hydrogen supply valve after the application of the purge valve opening signal and the valve duty of the hydrogen supply valve before the application of the purge valve opening signal, and comparing the difference value with a predetermined threshold value; and determining that the purge valve is opened when the calculated difference value calculated is equal to or greater than the threshold value.

In addition, when the calculated difference value is less than the threshold value, the purge valve may be determined to be closed, and a controller may be configured to transmit the purge valve opening signal again. The valve duty of the hydrogen supply valve may correspond to a consumed current of the hydrogen supply valve and thus, a consumed current of the hydrogen supply valve may be measured instead of the valve duty of the hydrogen supply valve, and whether the purge valve is opened may be determined using the measured consumed current value.

In another aspect, the present invention provides a method of controlling purge of a fuel cell system for a vehicle that may include: applying a purge valve closing signal, and detecting valve duties of a hydrogen supply valve before and after the application of the purge valve closing signal; calculating a difference value between the valve duty of the hydrogen supply valve after the application of the purge valve closing signal and the valve duty of the hydrogen supply valve before the application of the purge valve closing signal, and comparing the difference value with a predetermined threshold value; and when the calculated difference value is equal to or greater than the threshold value, determining that the purge valve is closed.

Additionally, when the calculated difference value is less than the threshold value, the purge valve may be determined to be open. The method may further include in response to determining that the purge valve is not closed (e.g., is open), transmitting, by a controller, the purge valve opening signal one or more times.

In still another exemplary embodiment, in response to determining that the purge valve is not closed even though the controller transmits the purge valve opening signal by the predetermined number of times, the method may include entering an emergency stage. In addition, the valve duty of the hydrogen supply valve may correspond to a consumed current of the hydrogen supply valve and thus, a consumed current of the hydrogen supply valve may be measured instead of the valve duty of the hydrogen supply valve, and whether the purge valve is closed may be determined using the measured consumed current value.

In still another aspect, the present invention provides a method of controlling purge of a fuel cell system for a vehicle that may include: applying a purge valve opening signal, and detecting valve duties of a hydrogen supply valve before and after the application of the purge valve opening signal; calculating a difference value between the valve duty of the hydrogen supply valve after the application of the purge valve opening signal and the valve duty of the hydrogen supply valve before the application of the purge valve opening signal, and comparing the difference value with a first predetermined threshold value; and when the calculated difference value is equal to or greater than the first threshold value, determining that the purge valve is opened; applying a purge valve closing signal, and detecting a valve duty of the hydrogen supply valve after the application of the purge valve closing signal; calculating a difference value between the valve duty of the hydrogen supply valve after the application of the purge valve closing signal and the valve duty of the hydrogen supply valve after the application of the purge valve opening signal, and comparing the difference value with a second predetermined threshold value; and when the calculated difference value is equal to or greater than the second threshold value, determining that the purge valve is closed.

Further, the valve duty of the hydrogen supply valve may correspond to a consumed current of the hydrogen supply valve and thus, a consumed current of the hydrogen supply valve may be measured instead of the valve duty of the hydrogen supply valve, and whether the purge valve is opened and closed may be determined using the measured consumed current value. When the calculated difference value is less than the first threshold value, the purge valve may be determined to be closed, and a controller may be configured to transmit a purge valve opening signal again.

When the calculated difference value is less than the second threshold value, the purge valve may be determined to be open. In addition, the method may further include in response to determining that the purge valve is not closed, entering an emergency stage to prevent hydrogen from additionally leaking through the purge valve.

In a further aspect, the present invention provides a method of controlling purge of a fuel cell system for a vehicle that may include: applying a purge valve opening signal, and calculating a difference between a hydrogen supply amount to a stack and a hydrogen consumption amount by the stack for each of the cases before and after the application of the purge valve opening signal; calculating a characteristic value based on a difference value between the hydrogen supply amount and the hydrogen consumption amount after the application of the purge valve opening signal and a difference value between the hydrogen supply amount and the hydrogen consumption amount before the application of the purge valve opening signal, and comparing the characteristic value with a predetermined threshold value; and determining that the purge valve is opened when the calculated characteristic value is equal to or greater than the threshold value.

When the calculated characteristic value is less than the threshold value, the purge valve may be determined to be closed, and a controller may be configured to transmit the purge valve opening signal again. In addition, the hydrogen supply amount may be determined based on mapping data of a consumed current and the hydrogen supply amount of the hydrogen supply valve, and the hydrogen consumption amount may be determined based on a current amount output from the stack.

In a still further aspect, the present invention provides a method of controlling purge of a fuel cell system for a vehicle that may include: applying a purge valve closing signal, and calculating a difference between a hydrogen supply amount to a stack and a hydrogen consumption amount by the stack for each of the cases before and after the application of the purge valve closing signal; calculating a characteristic value based on a difference value between the hydrogen supply amount and the hydrogen consumption amount after the application of the purge valve closing signal and a difference value between the hydrogen supply amount and the hydrogen consumption amount before the application of the purge valve closing signal, and comparing the characteristic value with a predetermined threshold value; and when the calculated characteristic value is equal to or greater than the predetermined threshold value, determining that the purge valve is closed.

In addition, when the calculated characteristic value is less than the threshold value, the purge valve may be determined to be open. The method may further include in response to determining that the purge valve is not closed, transmitting, by a controller, a purge valve opening signal one or more times.

In response to determining that the purge valve is not closed even though the controller transmits the purge valve opening signal by the predetermined number of times, the method may include entering an emergency stage. The hydrogen supply amount may be determined based on mapping data of a consumed current and the hydrogen supply amount of the hydrogen supply valve, and the hydrogen consumption amount may be determined based on a current amount output from the stack.

In a still yet further aspect, the present invention provides a method of controlling purge of a fuel cell system for a vehicle that may include: applying a purge valve opening signal, and calculating a difference between a hydrogen supply amount to a stack and a hydrogen consumption amount by the stack for each of the cases before and after the application of the purge valve opening signal; calculating a first characteristic value based on a difference value between the hydrogen supply amount and the hydrogen consumption amount after the application of the purge valve opening signal and a difference value between the hydrogen supply amount and the hydrogen consumption amount before the application of the purge valve opening signal, and comparing the first characteristic value with a first predetermined threshold value; when the first calculated characteristic value is equal to or greater than the first threshold value, determining that the purge valve is opened; applying a purge valve closing signal, and calculating a difference between a hydrogen supply amount and a hydrogen consumption amount after the application of the purge valve closing signal; calculating a second characteristic value based on a difference value between the hydrogen supply amount and the hydrogen consumption amount after the application of the purge valve closing signal and a difference value between the hydrogen supply amount and the hydrogen consumption amount after the application of the purge valve opening signal, and comparing the second characteristic value with a second predetermined threshold value; and when the second calculated characteristic value is equal to or greater than the second threshold value, determining that the purge valve is closed.

Furthermore, the hydrogen supply amount may be determined based on mapping data of a consumed current and the hydrogen supply amount of the hydrogen supply valve, and the hydrogen consumption amount may be determined based on a current amount output from the stack. When the first calculated characteristic value is less than the first threshold value, the purge valve may be determined to be closed, and a controller may be configured to transmit the purge valve opening signal again. When the second calculated characteristic value is less than the second threshold value, the purge valve may be determined to be open. In addition, the method may further include entering an emergency stage in response to determining that the purge valve is open.

According to the present invention, it may be possible to confirm whether the purge is actually performed by monitoring a used current (or duty) of the hydrogen supply valve. Accordingly, it may be possible to monitor whether the purge is performed using the used current of the hydrogen supply valve to prevent instability of an output of the stack and deterioration of durability of the stack due to abnormal performance of the purge valve (the purge is not performed) by more accurately confirming whether the purge is performed normally based on a result of the monitoring.

Additionally, according to the present invention, it may be possible to prevent hydrogen from additionally leaking to the exterior through the purge valve by confirming a situation, in which the purge valve is opened, thereby improving safety of a fuel cell vehicle. According to the present invention, it may further be possible to determine whether the purge is performed normally by monitoring a used duty or a consumed current of the hydrogen supply valve, thereby excluding an additional sensor, such as a purge valve position sensor and a water trap water level sensor. Accordingly, it may be possible to decrease cost by a decrease in components, and remove related connectors and wires, thereby securing a space within a vehicle.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

Figure 1:
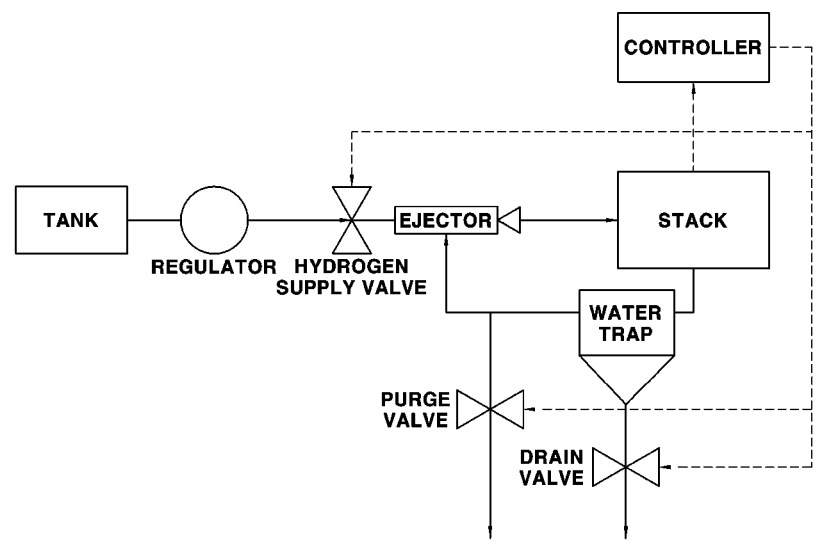
FIG. 1 is a configuration diagram of a fuel cell system including a purge valve and a drain valve according to an exemplary embodiment of the present invention.

It should be understood that the appended drawings are not necessarily to scale, presenting a somewhat simplified representation of various exemplary features illustrative of the basic principles of the invention. The specific design features of the present disclosure as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The present invention suggests a method of determining whether a purge function is performed normally (e.g., without error or failure) in controlling purge of discharging nitrogen, hydrogen, and vapor within an anode of a fuel cell system for a vehicle. Particularly, in an exemplary embodiment of the present invention, the present invention is configured to confirm whether purge is performed by measuring a duty or a current applied to a hydrogen supply valve and measuring a change in the duty before and after a purge valve operation command while adjusting a pressure inside the anode, which supplies hydrogen to the anode, to be maintained uniformly.

Further, in another exemplary embodiment of the present invention, the present invention is configured to estimate a hydrogen supply amount supplied into an anode, estimate a change rate of a hydrogen supply amount supplied to the anode and a hydrogen amount consumed during a power generation of the fuel cell system during a process of performing a purge function, and determine whether purge is performed based on the estimated information. Additionally, another characteristic of the present invention is to control the purge to be performed again in response to determining that the purge is not properly performed. Another characteristic of the present invention is to confirm that a purge valve is not normally closed, and enter an emergency logic to prevent hydrogen from additionally leaking through a purge valve in response to determining that it is impossible to normally close the purge valve.

Hereinafter, a method of controlling purge of a fuel cell system for a vehicle according to an exemplary embodiment of the present invention will be described in detail with reference to the accompanying drawings.

FIG. 1 is a configuration diagram of a fuel cell system including a purge valve and a drain valve. A structure of a hydrogen supply system, configured to supply hydrogen to a stack and re-circulate gas discharged from an anode of the stack, in the fuel cell system for the vehicle is illustrated in FIG. 1. Gas of high pressure (e.g., about 350 bar to 700 bar) stored in a hydrogen tank may be pressure-reduced (e.g., about 10 to 20 bar) using a regulator, and may be secondarily reduced (e.g., about 0 to 5 bar) using a hydrogen supply valve and an ejector to be supplied to the anode of the stack. The fuel cell system may have a re-circulation structure, in which gas discharged from the anode of the stack is re-circulated to the ejector, is mixed with hydrogen supplied from a tank, and is supplied to the stack again.

The fuel cell system may be configured in which the gas (e.g., mixed gas of hydrogen, nitrogen, vapor, and water) discharged from the anode of the stack passes through a water trap. The water trap may be configured to store condensate water discharged from the anode, and the condensate water may be removed through a drain valve installed at the water trap. Additionally, gas, in which the condensate water is removed, may be mixed with the hydrogen supplied from the tank through the ejector and re-circulated to the stack.

Furthermore, a phenomenon, in which vapor and water drops generated in a cathode, and nitrogen in the air cross over through a membrane electrode assembly (MEA) and flow to the anode, may occur inside the stack. When a hydrogen concentration of the anode is decreased by the vapor and the nitrogen flowing to the anode from the cathode of the stack, an operation state of the system becomes unstable. Accordingly, the fuel cell system uniformly maintains the hydrogen concentration inside the anode by installing a purge valve on a re-circulation line and discharging the gas inside the anode to an exhaust line or the exterior using the purge valve. Further, when the amount of water collected inside the water trap is equal to or greater than a predetermined amount, the water may overflow to the exterior of the water trap and flow into the stack through the re-circulation line, and thus, the water may be discharged to the exterior through the drain valve.

The purge valve configured to perform the purge function and the drain valve configured to discharge water inside the water trap have similar application positions or functions. Both the two valves may be disposed on the anode re-circulation line, and perform a function of discharging a fluid inside the anode to the exterior or the cathode or an exhaust pipe of the fuel cell system. However, the drain valve is a valve configured to discharge water, and thus, there is a limitation in the position in that the drain valve requires connection to the water trap. In the fuel cell system, the operations of the hydrogen supply valve, the drain valve, and the purge valve are electrically operated using a controller. Particularly, a generation current and voltage, and the like of the stack may be monitored using the controller, and the controller may be formed of a single controller or a plurality of controllers which communicate with each other either wireless or by a wired connection.

Figure 2:
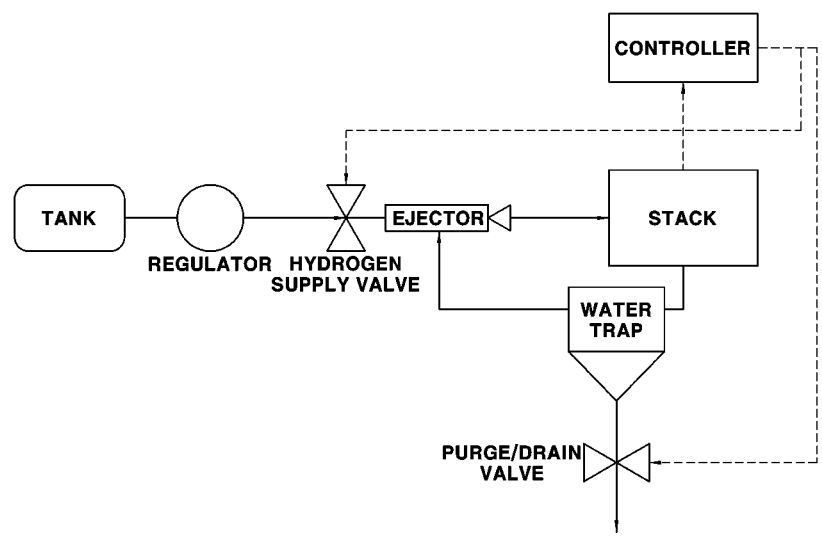
FIG. 2 is a configuration diagram of a fuel cell system having an integrated purge/drain valve according to an exemplary embodiment of the present invention.

Moreover, FIG. 2 is a configuration diagram of a fuel cell system having an integrated purge/drain valve, and is different from the example of FIG. 1 in that the fuel cell system does not include the purge valve, and performs the purge function and the drain function with a valve installed in a water trap. Accordingly, the configuration of the example of FIG. 2 is the same as that of FIG. 1 except that the purge valve is not included and the integrated purge/drain valve is operated by a controller.

Figure 3:
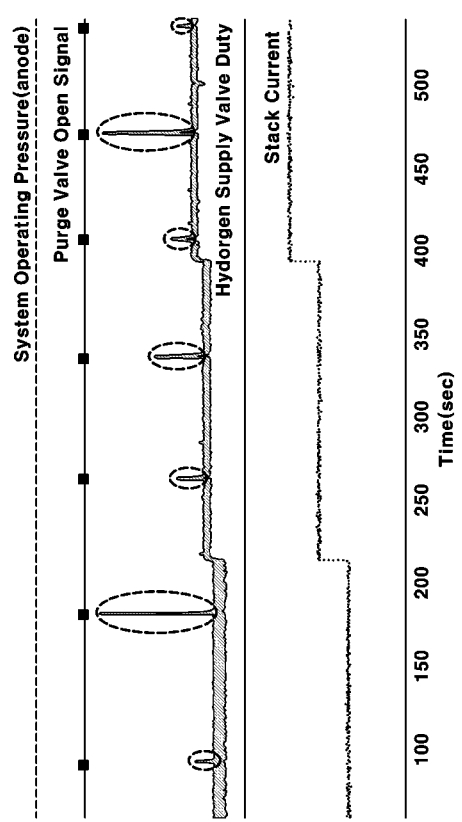
FIG. 3 is a graph illustrating a stack current, an applied valve duty according to purge together with a purge valve opening signal in a constant current condition according to an exemplary embodiment of the present invention.

A monitoring result of a generated current of the stack, an applied duty of the hydrogen supply valve, and a purge valve operation signal under an operation condition of the fuel cell system including the aforementioned configuration is illustrated in FIG. 3. In particular, a pressure of the anode may be uniformly maintained. Referring to FIG. 3, under the condition in which the pressure of the anode is uniformly maintained, a valve duty of the hydrogen supply valve may be uniformly maintained based on a stack current generated in the stack.

Additionally, FIG. 3 shows that a peak point, at which the valve duty of the hydrogen supply valve is sharply increased and then decreased, may be formed based on a generation time of an operation signal (indicated by a dot) for the purge valve. Particularly, when the purge valve is operated, a high duty may be applied to the hydrogen supply valve, and then the valve duty may be decreased again after the termination of the purge. In other words, to additionally supply hydrogen during the performance of the purge, a high duty may be applied to the hydrogen supply valve and thus, the valve duty may be increased compared when the purge is not performed. When the purge is terminated, the hydrogen supply amount may be decreased and thus the applied valve duty may be decreased, so that a square wave or a high peak illustrated in FIG. 3 is represented. In other words, in FIG. 3, a portion, at which the high peak is formed, is generated as illustrated in a portion indicated by an oval for the valve duty of the hydrogen supply valve, and a time of the generation corresponds to a purge valve opening signal. Accordingly, when a change in the valve duty of the hydrogen supply valve is monitored, it may be possible to confirm whether the purge valve is opened.

Figure 4:
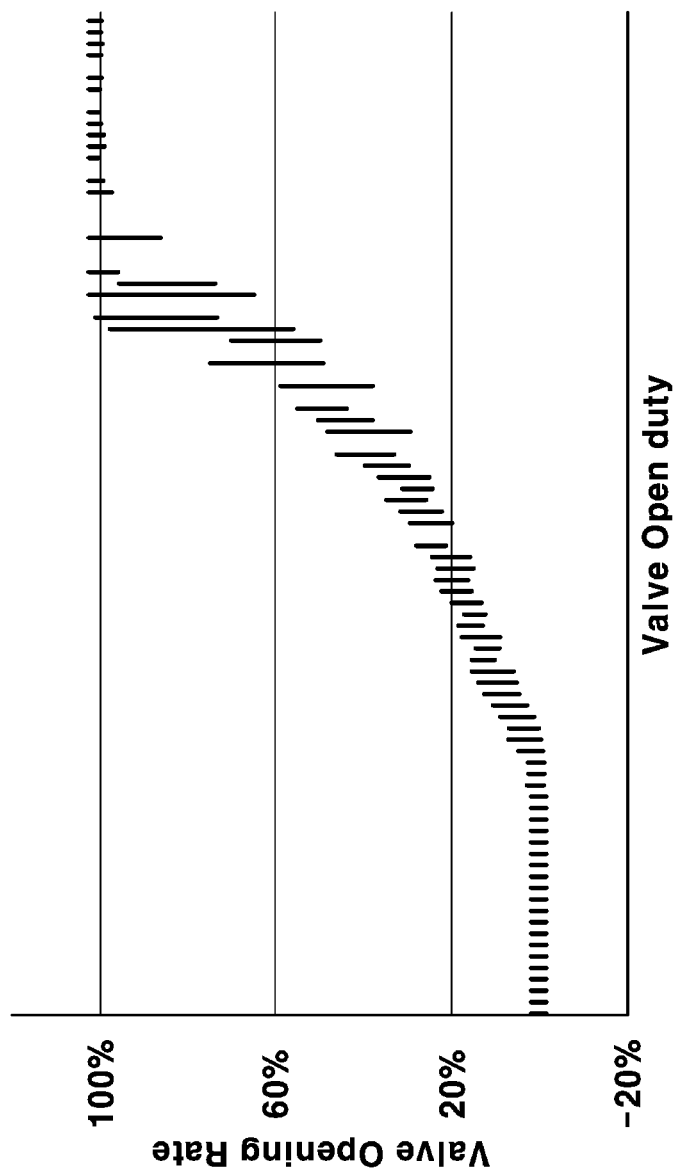
FIG. 4 is a graph illustrating a valve opening degree according to an applied valve duty of a hydrogen supply valve according to an exemplary embodiment of the present invention.

FIG. 4 illustrates a valve opening degree based on a valve duty of the hydrogen supply valve. Referring to FIG. 4, the valve duty and an opening degree of the hydrogen supply valve generally have a linear relationship. Considering FIGS. 3 and 4, FIG. 3 shows that a duty (e.g., corresponding to a consumed current) of the valve is represented with a specific valve based on the hydrogen supply amount (e.g., about the same as the amount of hydrogen consumed by the stack) under a specific current condition.

Particularly, when the purge is performed, to uniformly maintain a pressure inside the anode, an additional hydrogen supply is required as much as the amount of gas purged and discharged to the exterior. As a result, the controller may be configured to increase the opening degree of the valve by applying a higher duty to the valve. Accordingly, the duty amount increased as illustrated in FIG. 3 is represented as a peak value. Thus, it may be possible to confirm whether the purge is generated by monitoring the valve duty applied to the hydrogen supply valve, and to thus confirm whether the purge is performed by monitoring the consumed current in the hydrogen supply valve. More particularly, it may be possible to confirm whether the purge valve is opened by comparing duty values (or consumed currents of the hydrogen supply valve) before and after a transfer of an opening command to the purge valve with duty valves (or consumed currents of the hydrogen supply valve) at the opening time of the purge valve.

Moreover, in another exemplary embodiment of the present invention, to more accurately confirm whether the purge valve is opened, a valve opening degree performance map based on a valve duty of the hydrogen supply valve may be used. In particular, it may be possible to confirm whether the purge is generated by calculating the amount of hydrogen supplied to the stack using the valve opening degree performance map and measuring a consumed current of the hydrogen supply valve to calculate a hydrogen consumption amount by the stack, and comparing the hydrogen supply amount and the hydrogen consumption amount. The hydrogen supply amount through the hydrogen supply valve may be proportional to an opening degree of the hydrogen supply valve, and the opening degree of the hydrogen supply valve may be calculated using the performance map with the valve duty (or the consumed current). Accordingly, through the relationship, it may be possible to map or correlate the hydrogen supply amount through the hydrogen supply valve to the valve duty.

A relationship of the opening degree of the valve based on the valve duty may vary based on a temperature condition of a coil, and thus when a temperature is compensated or the consumed current and the hydrogen supply amount of the valve, which are not influenced by a temperature, are mapped, it may be possible to further improve accuracy in calculating the hydrogen supply amount. The current generated in the stack and the hydrogen consumption amount have a linearly proportional relationship, and more accurately, the hydrogen consumption amount may be defined by a function of (the generated current, the number of cells of the stack, a pressure, and a temperature). The hydrogen may be lost by a movement to the cathode side through the MEA, however, the amount of the lost hydrogen is minimal and thus negligible.

In consideration of the aforementioned relationship, a difference between the hydrogen consumption amount derived from the consumed current of the hydrogen supply valve and the hydrogen consumption amount derived from the current generated by the stack may be determined as a gas leakage amount generated by the purge. Although an error may occur, a time before and after the purge is minimal (e.g., an opening time of the purge valve may be about 2 seconds or less), and thus, an error in a value added for a minimal period of time is minimal, and thus negligible.

Therefore, according to the exemplary embodiment of the present invention, the present invention is characterized in that each of the duties of the valve or the consumed currents of the hydrogen supply valve before and after an application time of the purge valve opening signal may be measured, and when a difference value between the measured duties of the valve or the measured consumed currents exceeds a predetermined value, the purge valve may be determined opened.

Whether the purge valve is closed again after the purge valve is operated normally (e.g., without error or failure) and opened may also be determined by measuring the duties of the valve or the consumed currents of the hydrogen supply valve before and after an application time of a purge valve closing signal and comparing a difference value between the measured duties of the valve or the measured consumed currents with a predetermined value. Hereinafter, the present invention will be described based on the consumed current of the hydrogen supply valve, but the description is equally applied to a case of the valve duty of the hydrogen supply valve.

Figure 5:
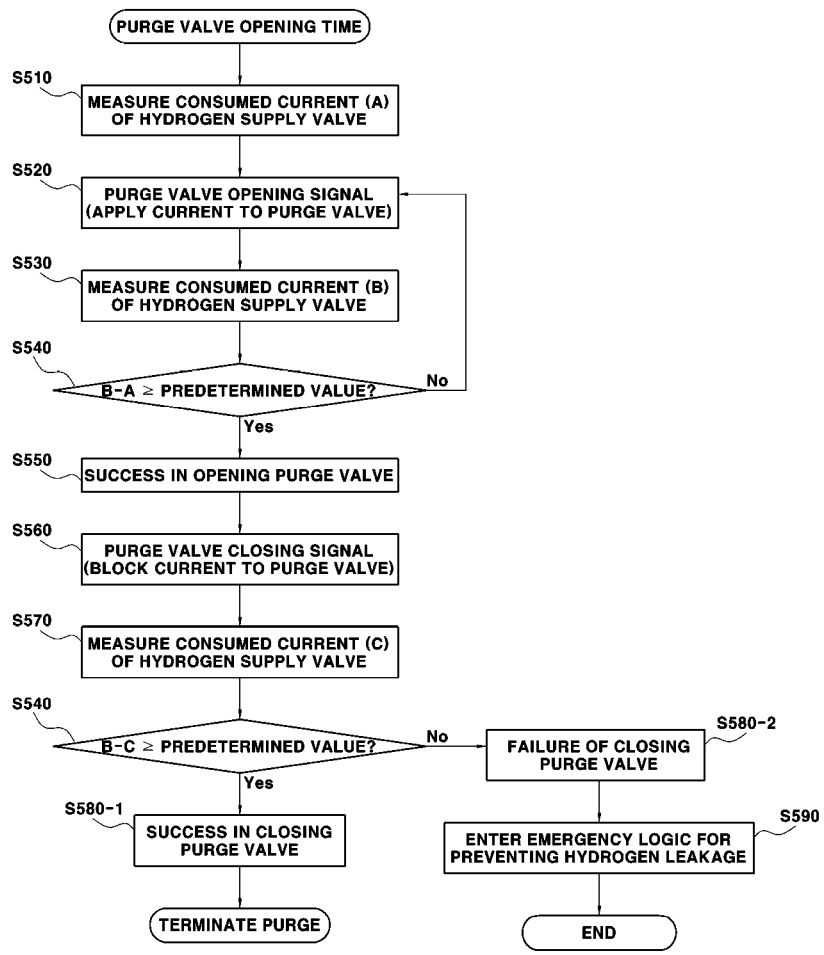
FIG. 5 is a flowchart illustrating a method of controlling purge of a fuel cell system for a vehicle according to an exemplary embodiment of the present invention.

FIG. 5 is a flowchart illustrating a method of controlling purge of the fuel cell system for the vehicle implemented according to the aforementioned method according to an exemplary embodiment of the present invention. A determination logic is divided into processes S510 to S550 of determining whether the purge valve is opened, and processes S560 to S590 of determining whether the purge valve is closed, and a concept of each process is the same as the aforementioned concept. Further, a series of controls and operations may be performed by the controllers of FIGS. 1 and 2.

First, a consumed current A before an application time of a purge valve opening signal, that is, a time of an application of a current to the purge valve, may be measured by monitoring a consumed current of the hydrogen supply valve at an opening time of the purge valve (S510). Then, a consumed current B of the hydrogen supply valve after the application of the opening signal of the purge valve (S520) may be measured (S530), and a difference between the two measured consumed current values may be compared with a first predetermined threshold value (S540).

In particular, the first threshold value may be set from data as illustrated in the graph of FIG. 3, and may be set based on a valve duty at a peak time generated during the purge. As a result, when a value of "B−A" is equal to or greater than the first threshold value and the consumed current is sharply changed before and after the opening of the purge valve, and the purge valve may be determined to be opened based on a change in an opening degree of the hydrogen supply valve (S550). Accordingly, when the value of "B−A" is greater than the first threshold value, the controller may be configured to determine that the purge valve is successfully opened and a next operation may be performed. However, when the value of "B−A" is less than the first threshold value, the controller may be configured to determine that the purge valve is not opened (e.g., remains closed) and the purge valve opening signal may be re-applied.

In addition, in response to determining that the purge valve is opened and then the purge valve is opened for a predetermined period of time, a purge valve closing signal for blocking the current applied to the purge valve may be applied (S560). In the determination of whether the purge valve is closed, similar to the aforementioned determination regarding whether the purge valve is opened, the consumed currents of the hydrogen supply valve before and after the application of the purge valve closing signal may be measured. However, the consumed current of the hydrogen supply valve before the application of the purge valve closing signal may use the consumed current value B after the application of the purge valve opening signal.

Each of the consumed current B of the hydrogen supply valve before the application of the purge valve closing signal and a consumed current C of the hydrogen supply valve after the application of the purge valve closing signal may be measured (S570), and a difference (B−C) of the measured consumed current values may be compared with a second predetermined threshold value (S580). As a result of the comparison, when a value of "B−C" is equal to or greater than the second threshold value, the controller may be configured to determine that the purge valve is successfully closed (S580-1) and the purge may be terminated.

Notably, the first and second threshold values may be related to internal volumes of a fuel electrode and recirculating system of each stack, discharging amount of a purge valve, and the valve duty of the hydrogen supply valve and a measured error (e.g., noise). Therefore, the threshold values may vary based on the system. For example, when the noise of the valve duty of the hydrogen supply valve is about 5%, the threshold value may be set to be about 5% or greater. When the gas supply amount caused by the opening of purge valve is at least 200 nlpm and the valve duty of the hydrogen supply valve is about 10%, the threshold values may be set to about 5-10%.

However, when the value of "B−C" is less than the second threshold value, failure of closing the purge valve may be determined (S580-2). Additionally, upon failure of closing the purge valve, the method may include entering an emergency logic to prevent a leakage of hydrogen, to thus secure stability of the vehicle (S590). The emergency logic may prevent hydrogen from leaking to the exterior, and may be configured to weaken a hydrogen leak by operating an air blower or may be implemented by a method of stopping the supply of hydrogen and switching a mode of the vehicle to an electric vehicle (EV) mode.

In addition, as illustrated in FIG. 2, when the purge is performed using the drain valve mounted in the water trap without a separate purge valve, a situation, in which the purge is not performed due to water remaining inside the water trap and only water is discharged, may be generated. Accordingly, gas may be placed in a dischargeable state by discharging water inside the water trap by operating the drain valve before the performance of the purge. Thus, to detect whether the water inside the water trap is discharged, a water level sensor configured to detect the amount of water inside the water trap and a drain valve position sensor configured to determine whether the drain valve is normally opened may be applied.

However, according to the exemplary embodiment of the present invention, whether the purge is performed may be confirmed using the consumed current of the hydrogen supply valve, and thus, it may be possible to perform the purge using the drain valve without the water level sensor inside the water trap and the drain valve position sensor. In other words, when the drain valve is operated at the same time, a substantial difference exists in a volume of discharged fluids between when the water is discharged and when the gas is discharged. Accordingly, the amount of hydrogen supplied for uniformly maintaining a pressure inside the anode when the drain valve discharges water and the amount of supplied hydrogen when the drain valve discharges gas have a difference of several times to several tens of times.

Accordingly, when only water is discharged during the opening of the drain valve, a volume variation by the change in a water level is minimal, and thus, the hydrogen supply amount through the hydrogen supply valve is minimal and a variation of the consumed current is minimal. However, when the water is completely discharged and the gas begins to be discharged, the hydrogen supply amount is substantial (e.g., increased), thus causing an increase in the amount of consumed current of the hydrogen supply valve. Thus, even when the integrated purge/drain valve illustrated in FIG. 2 is used, it may be possible to confirm whether the purge is performed normally by detecting the amount of consumed current of the hydrogen supply valve according to the same method illustrated in FIG. 5.

In particular, the purge valve in the present invention indicates a valve configured to perform the purge function, and is not limited to the purge valve disposed in the structure limited as the exemplary embodiment of the present specification. Accordingly, it shall be interpreted that the purge valve may further include various structures capable of implementing the purge function, for example, the integrated purge/drain valve illustrated in FIG. 2. Finally, according to the exemplary embodiment of the present invention, the water level sensor mounted in the water trap and the position sensor mounted in the purge valve may be removed, thereby contributing to decreasing cost and improving a product quality of the fuel cell system.

FIG. 5 illustrates the opening/closing processes of the purge valve, but as divided in FIG. 5, the present invention may be configured to selectively determine whether the purge valve is opened or closed by dividing the method into a process of determining only whether the purge valve is opened or a process of determining only whether the purge valve is closed, and applying only any one process.

Figure 6:
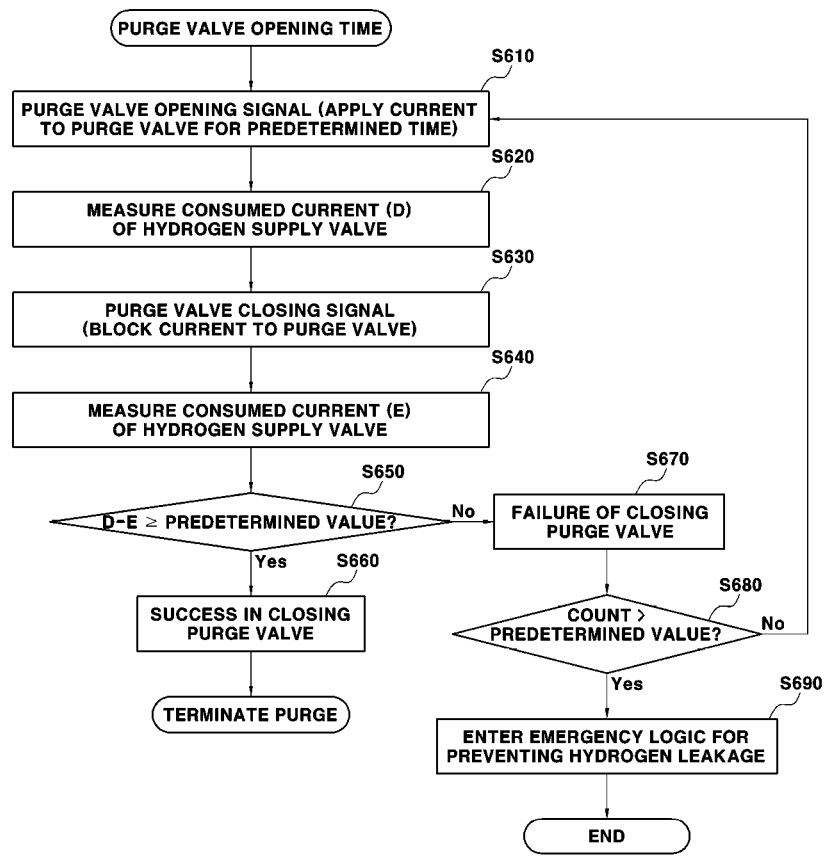
FIG. 6 is a flowchart illustrating a method of controlling purge of a fuel cell system for a vehicle according to another exemplary embodiment of the present invention.

FIG. 6 illustrates an example implemented by using only one selected process, and illustrates a method of determining whether the purge valve is opened/closed by measuring consumed currents of the hydrogen supply valve before and after the purge valve closing signal. In particular, the closing of the hydrogen supply valve may be determined based on the opening of the purge valve. In other words, satisfying a condition of operation S650 of FIG. 6 indicates that a difference in a consumed current of a predetermined level or greater is generated, and indicates that the purge valve is opened.

An exemplary embodiment of FIG. 6 is substantially implemented according to the same concept as that of FIG. 5, and the present invention is configured so that whether the purge valve is opened is not determined during the opening of the purge valve, and whether the purge valve is opened may be confirmed after the completion of the purge, that is, based on whether the purge valve is closed. Further, the present invention may be configured to perform the purge again from an operation of generating the purge valve opening signal upon failure to purge. In addition, in consideration of a vehicle stability issue caused by hydrogen leakage, the present invention may also be configured to transmit only the purge valve closing signal instead of generating the purge valve opening signal again. Particularly, differently from FIG. 6, when failure of closing the purge valve through operation S680 is determined, the method is configured not to return to operation S610, and but return to operation S630, and transmit the purge valve closing signal again.

According to the present exemplary embodiment, after the purge valve opening signal is generated (S610), and then a consumed current D of the hydrogen supply valve is measured (S620), and a consumed current E of the hydrogen supply valve may be measured again (S640) after the purge valve closing signal is generated (S630). Further, a difference value (D−E) between the consumed currents of the hydrogen supply valve may be compared with a predetermined threshold value (S650), and when the difference value (D−E) is equal to or greater than the predetermined threshold, the controller may be configured to determine that the purge valve is opened or closed (S660), and the purge may be terminated. However, when the difference value (D−E) is less than the predetermined threshold, the controller may be configured to determine that the purge valve is not closed (S670).

In response to determining that the purge valve is not closed (e.g., is open), the method may be configured to perform re-purge, and for the stability of the vehicle, it may be possible to prevent hydrogen from leaking to the exterior when an error is generated by limiting the number of times of performance of the re-purge to a predetermined number or less. Accordingly, as illustrated in FIG. 6, when failure of closing the purge valve (S670) is determined, the opening (or closing) signal of the purge valve may be re-applied (return to operation S610 or S630) and in response to determining that the purge valve is not closed even though the signal is re-applied by the predetermined number of times, the method may be configured to enter the emergency logic to prevent hydrogen from leaking.

In particular, there are advantages in that it may be possible to prevent the purge valve from being opened for an excessively long period of time due to an error in the determination of the opening of the purge valve, and it may be possible to more simply form the logic, to decrease a determination time, but there is a disadvantage in that there is a possibility that the purge may be excessively delayed more than a target time. In the present exemplary embodiment, whether the purge is performed may be confirmed by the method of comparing the consumed current of the hydrogen supply valve during the performance of the purge with the consumed current of the hydrogen supply valve after the purge is completed, but as described above, whether the purge is performed may be confirmed by a changed method of comparing the consumed current of the hydrogen supply valve before the operation of the purge valve with the consumed current of the hydrogen supply valve during the performance of the purge.

Although not illustrated, the logic may be configured using the former part (S510-S550) between the two parts of FIG. 5, and the purge valve opening signal may be used as a purge valve driving signal instead of the purge valve closing signal. Accordingly, those skilled in the art may fully understand that another exemplary embodiment may be implemented by the method of comparing the consumed current of the hydrogen supply valve before the purge valve is opened with the consumed current of the hydrogen supply valve during the performance of the purge, that is, after the opening of the hydrogen supply valve.

Figure 7:
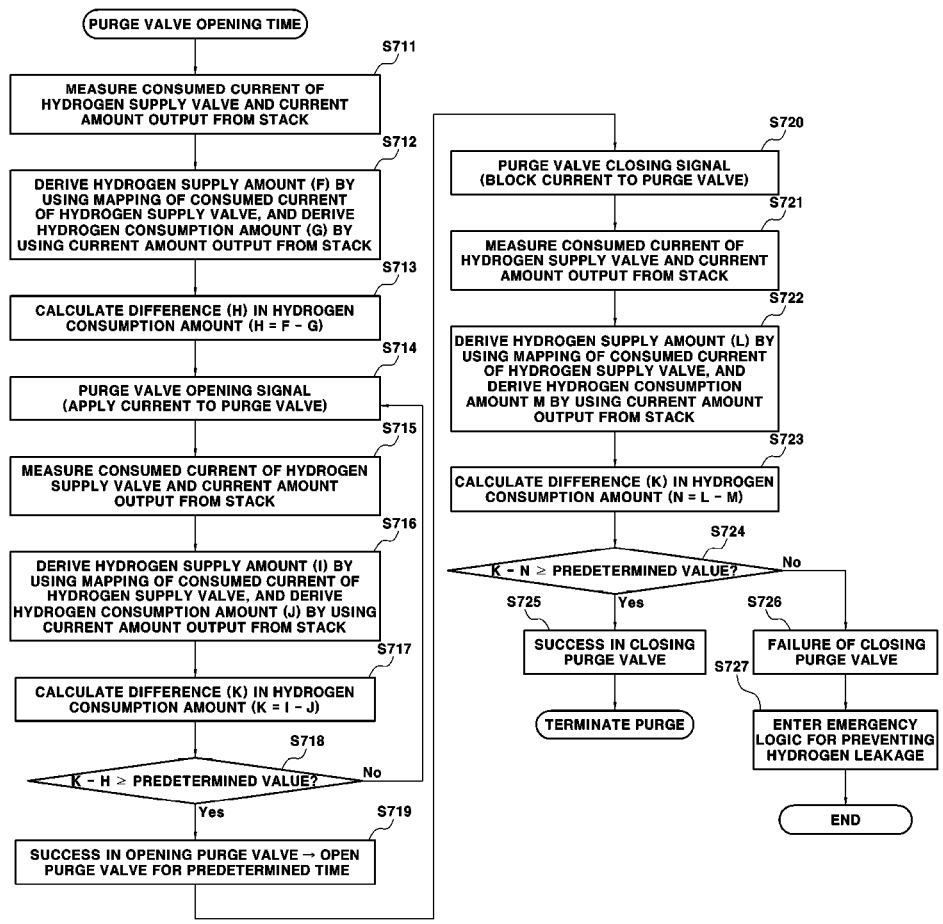
FIG. 7 is a flowchart illustrating a method of controlling purge of a fuel cell system for a vehicle according to yet another exemplary embodiment of the present invention.

FIG. 7 is a flowchart illustrating a method of controlling purge of a fuel cell system for a vehicle according to yet another exemplary embodiment of the present invention, and illustrates a method of using a hydrogen consumption amount by the stack for more accurately determining whether the purge is performed. Particularly, in the present exemplary embodiment, to more accurately measure whether the purge valve is opened, the present invention may be configured to calculate a hydrogen supply amount supplied to the stack and a hydrogen consumption amount consumed in the stack and confirm whether the purge is performed using the calculated values, in addition to the detecting the change in the consumed current of the hydrogen supply valve.

Accordingly, in the present exemplary embodiment, the hydrogen supply amount may be derived from the consumed current (or the valve duty) of the hydrogen supply valve and the hydrogen consumption amount may be derived using a current amount output from the stack. The derivation of the hydrogen supply amount and the hydrogen consumption amount has been described above, and thus the description thereof will be omitted. According to the exemplary embodiment, there is an advantage in that an error by a change in an output generated during a period of the purge may be reflected to the determination of the opening of the purge valve, but there is a disadvantage in that the control logic may be complex and the amount of calculation may increase. When a measurement time increases, an error is accumulated, and thus, accuracy in the determination of the opening/closing of the purge valve deteriorates. Therefore the calculation of the hydrogen supply amount may be performed for a shorter period of time before and after the application of the opening/closing signal of the purge valve.

Referring to FIG. 7, each of a consumed current of the hydrogen supply valve and a current amount output from the stack may be measured (S711). Then, a hydrogen supply amount F may be derived using the mapping of the consumed current of the hydrogen supply valve, and a hydrogen consumption amount G may be derived using the current amount output from the stack (S712). A difference H between the derived hydrogen supply amount F and the derived hydrogen consumption amount G may be calculated (S713), and stored.

Further, a purge valve opening signal may be applied or transmitted (S714), and the consumed current of the hydrogen supply valve and the current amount output from the stack may be measured again (S715). A hydrogen supply amount I and a hydrogen consumption amount J may be derived again using the measured values by the same method as that of operation S712 (S716). Similar to operation S713, a difference K between the derived hydrogen supply amount I and the derived hydrogen consumption amount J may be calculated (S717), and a difference (K−H) between the value K calculated in operation S717 and the value H calculated in operation S713 may be compared with a predetermined value (S718).

As a result of the comparison, when the difference (K−H) between the two values is equal to or greater than the predetermined value, the controller may be configured to determine that the purge valve is opened (S719), and after a predetermined period of time elapses, that is, the purge valve is opened for a predetermined period of time, a purge valve closing signal may be applied (S720). However, when the difference (K–H) between the two values is less than the predetermined value, the controller may be configured to determine that the purge valve is not opened, and the operation returns to operation S714 and whether the purge valve is opened is determined again.

After the application of the purge valve closing signal (S720), a difference between a hydrogen supply amount L and a hydrogen consumption amount M may be calculated by the same method as the aforementioned method. In other words, the consumed current of the hydrogen supply valve and the current amount output from the stack after the application the purge valve closing signal may be measured (S721), and the hydrogen supply amount L and the hydrogen consumption amount M may be derived using the measured values (S722). Then, a difference N between the derived hydrogen supply amount L and the derived hydrogen consumption amount M may be calculated (S723), and a difference (K–N) between the value K calculated in operation S717 and the value N calculated in operation S713 may be compared with a predetermined value (S724). As a result of the comparison, when the difference (K–N) between the two values is equal to or greater than the predetermined value, the controller may be configured to determine that the purge valve is closed (S725), and the purge may be terminated. However, when the difference (K–N) between the two values is less than the predetermined value, the controller may be configured to determine that the purge valve is not closed (S726), and the operation enters the emergency logic for preventing hydrogen from leaking (S727).

In addition, the exemplary embodiment of FIG. 7 may also include only a selective process for confirming whether the purge valve is opened or closed, like in the relationship of the exemplary embodiments of FIGS. 5 and 6. Particularly, in the performance of the selective process, the method is configured so that a difference in the hydrogen consumption amount obtained from the difference value between the hydrogen supply amount to the stack and the hydrogen consumption amount by the stack before and after the application of the purge valve driving signal has a positive value (e.g., "K–H" or "K–N"), and the difference value may be compared with a threshold value.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method of controlling purge of a fuel cell system for a vehicle,
comprising:
applying, by a controller, a purge valve driving signal for opening or closing a purge valve, and detecting valve duties of a hydrogen supply valve before and after the application of the purge valve driving signal;
calculating, by the controller, a difference value between the valve duty of the hydrogen supply valve after the application of the purge valve driving signal and the valve duty of the hydrogen supply valve before the application of the purge valve driving signal, and comparing the difference value with a predetermined threshold value; and
determining, by the controller, whether the purge valve is operated without error by comparing the calculated difference value with the threshold value,
wherein the valve duty of the hydrogen supply valve corresponds to a consumed current of the hydrogen supply valve, and a consumed current of the hydrogen supply valve is measured instead of the valve duty of the hydrogen supply valve, and whether the purge valve is opened is determined using the measured consumed current value.

2. The method of claim 1, wherein when the calculated difference value is equal to or greater than the threshold value, the purge valve is determined to opened or closed without error.

3. The method of claim 1, wherein when the calculated difference value is less than the threshold value, the purge valve is determined to open or close with an error, and the controller is configured to transmit an opening or closing signal of the purge valve again.

4. The method of claim 3, further comprising:
entering, by the controller, an emergency stage to prevent hydrogen from leaking in response to determining that the purge valve is closed with the error.

5. A method of controlling purge of a fuel cell system for a vehicle,
comprising:
applying, by a controller, a purge valve opening signal, and detecting valve duties of a hydrogen supply valve before and after the application of the purge valve driving signal;
calculating, by the controller, a difference value between the valve duty of the hydrogen supply valve after the application of the purge valve opening signal and the valve duty of the hydrogen supply valve before the application of the purge valve opening signal, and comparing the difference value with a first predetermined threshold value; and
when the calculated difference value calculated is equal to or greater than the first threshold value, determining, by the controller, that the purge valve is opened;
applying, by the controller, a purge valve closing signal, and detecting the valve duty of the hydrogen supply valve after the application of the purge valve closing signal;
calculating, by the controller, a difference value between the valve duty of the hydrogen supply valve after the application of the purge valve closing signal and the valve duty of the hydrogen supply valve after the application of the purge valve opening signal, and comparing the difference value with a second predetermined threshold value; and
when the calculated difference value calculated is equal to or greater than the second threshold value, determining, by the controller, that the purge valve is closed,
wherein the valve duty of the hydrogen supply valve corresponds to a consumed current of the hydrogen supply valve, and a consumed current of the hydrogen supply valve is measured instead of the valve duty of the hydrogen supply valve, and whether the purge valve is opened and closed is determined using the measured consumed current value.

6. The method of claim 5, wherein when the calculated difference value calculated is less than the first threshold value, the purge valve is determined to be closed, and the controller is configured to transmit a purge valve opening signal again.

7. The method of claim 5, wherein when the calculated difference value calculated is less than the second threshold value, the purge valve is determined to be opened.

8. The method of claim 7, further comprising:
entering, by the controller, an emergency stage to prevent hydrogen from leaking in response to determining that the purge valve is opened.

9. A method of controlling purge of a fuel cell system for a vehicle, comprising:
applying, by a controller, a purge valve driving signal for opening or closing a purge valve, and calculating a difference between a hydrogen supply amount to a stack and a hydrogen consumption amount by the stack for before and after the application of the purge valve driving signal;
calculating, by the controller, a characteristic value ($d1=|c2-c1|$) based on a second difference value (c2) between the hydrogen supply amount and the hydrogen consumption amount after the application of the purge valve driving signal and a first difference value between the hydrogen supply amount and the hydrogen consumption amount before the application of the purge valve driving signal, and comparing the characteristic value with a predetermined threshold value; and
determining, by the controller, whether the purge valve is operated without error by comparing the calculated characteristic value calculated with the threshold value,
wherein the hydrogen supply amount is determined based on mapping data of a consumed current and the hydrogen supply amount of the hydrogen supply valve, and the hydrogen consumption amount is determined based on a current amount output from the stack.

10. The method of claim 9, wherein when the calculated characteristic value is equal to or greater than the threshold value, the purge valve is determined to be opened or closed without error.

11. The method of claim 9, wherein when the calculated characteristic value is less than the threshold value, the purge valve is determined to be opened or closed with an error, and the controller is configured to transmit an opening or closing signal of the purge valve again.

12. The method of claim 11, further comprising:
entering, by the controller, an emergency stage to prevent hydrogen from leaking in response to determining that the purge valve is closed with the error.

13. A method of controlling purge of a fuel cell system for a vehicle, comprising:
applying, by a controller, a purge valve opening signal, and calculating a difference between a hydrogen supply amount to a stack and a hydrogen consumption amount by the stack for before and after the application of the purge valve opening signal;
calculating, by the controller, a first characteristic value ($d1=|c2-c1|$) based on a sec difference value (c2) between the hydrogen supply amount and the hydrogen consumption amount after the application of the purge valve opening signal and a first value (c1) between the hydrogen supply amount and the hydrogen consumption amount before the application of the purge valve opening signal, and comparing the first characteristic value with a first predetermined threshold value;
when the first calculated characteristic value is equal to or greater than the first threshold value, determining, by the controller, that the purge valve is opened;
applying, by the controller, a purge valve closing signal, and calculating a difference between a hydrogen supply amount and a hydrogen consumption amount after the application of the purge valve closing signal;
calculating, by the controller, a second characteristic value ($d2=|c4-c3|$) based on a fourth difference value (c4) between the hydrogen supply amount and the hydrogen consumption amount after the application of the purge valve closing signal and a third difference value (c3) between the hydrogen supply amount and the hydrogen consumption amount after the application of the purge valve closing signal, and comparing the second characteristic value with a second predetermined threshold value; and
when the calculated second characteristic value is equal to or greater than the second threshold value, determining, by the controller, that the purge valve is closed,
wherein the hydrogen supply amount is determined based on mapping data of a consumed current and the hydrogen supply amount of the hydrogen supply valve, and the hydrogen consumption amount is determined based on a current amount output from the stack.

14. The method of claim 13, wherein when the first calculated characteristic value is less than the first threshold value, the purge valve is determined to be closed, and the controller is configured to transmit the purge valve opening signal again.

15. The method of claim 13, wherein when the second calculated characteristic value is less than the second threshold value, the purge valve is determined to be opened.

16. The method of claim 15, further comprising:
entering, by the controller, an emergency stage to prevent hydrogen from leaking in response to determining that the purge valve is opened.

* * * * *